(12) United States Patent
Royere

(10) Patent No.: US 9,236,152 B2
(45) Date of Patent: Jan. 12, 2016

(54) METHOD AND DEVICE FOR DETECTING THE DROP OF A CLUSTER IN A NUCLEAR REACTOR

(75) Inventor: Christian Royere, Clamart (FR)

(73) Assignee: AREVA NP, Courbevoie (FR)

(*) Notice: Subject to any disclaimer, the term of this patent is extended or adjusted under 35 U.S.C. 154(b) by 207 days.

(21) Appl. No.: 13/512,842

(22) PCT Filed: Nov. 30, 2010

(86) PCT No.: PCT/EP2010/068572
§ 371 (c)(1),
(2), (4) Date: Jun. 20, 2012

(87) PCT Pub. No.: WO2011/064400
PCT Pub. Date: Jun. 3, 2011

(65) Prior Publication Data
US 2012/0263266 A1    Oct. 18, 2012

(30) Foreign Application Priority Data

Nov. 30, 2009 (FR) .................................. 09 58493

(51) Int. Cl.
| | | |
|---|---|---|
| *G21C 17/00* | (2006.01) | |
| *G21C 17/10* | (2006.01) | |
| *G21C 9/02* | (2006.01) | |
| *G21C 7/08* | (2006.01) | |
| *G21C 17/108* | (2006.01) | |

(52) U.S. Cl.
CPC ...... *G21C 17/10* (2013.01); *G21C 9/02* (2013.01); *G21C 17/00* (2013.01); *G21C 7/08* (2013.01); *G21C 17/108* (2013.01); *Y02E 30/40* (2013.01)

(58) Field of Classification Search
None
See application file for complete search history.

(56) References Cited

U.S. PATENT DOCUMENTS

| 4,277,308 A | * | 7/1981 | Rusch et al. .................. 376/254 |
| 4,318,778 A | * | 3/1982 | Musick ......................... 376/216 |
| 4,399,095 A | * | 8/1983 | Morris .......................... 376/216 |
| 4,678,622 A | * | 7/1987 | Rowe et al. ................... 376/259 |
| 4,716,009 A | * | 12/1987 | Thaulez ........................ 376/242 |
| 4,842,805 A | | 6/1989 | Bourin et al. |
| 4,927,594 A | * | 5/1990 | Heibel et al. .................. 376/258 |
| 4,983,350 A | | 1/1991 | Foret |
| 4,986,952 A | * | 1/1991 | Bourin et al. ................. 376/215 |
| 6,118,837 A | | 9/2000 | Krien et al. |
| 8,824,617 B2 | * | 9/2014 | Sexton et al. ................. 376/258 |
| 2009/0252272 A1 | | 10/2009 | Hashemian et al. |

OTHER PUBLICATIONS

International Search Report for International Application No. PCT/EP2010/068572 mailed Mar. 23, 2011.

* cited by examiner

*Primary Examiner* — Jack W Keith
*Assistant Examiner* — Sharon M Davis
(74) *Attorney, Agent, or Firm* — Pearl Cohen Zedek Latzer Baratz LLP

(57) ABSTRACT

The present invention relates to a method for detecting the drop of a cluster in a pressurized-water nuclear reactor, comprising the steps of: detecting a negative time derivative of the neutron flux, and comparing the absolute value of said time derivative to a first threshold value ($S_1$); triggering a time delay ($\Delta T$) if said absolute value is greater than said threshold value ($S_1$); detecting a positive time derivative of said neutron flux, and comparing the absolute value of said time-derivative to a second threshold value ($S_2$); and triggering the emergency shutdown of the reactor if the absolute value of said positive time derivative of said flux becomes greater than said second threshold value ($S_2$) during said time delay ($\Delta T$).

11 Claims, 2 Drawing Sheets

METHOD AND DEVICE FOR DETECTING THE DROP OF A CLUSTER IN A NUCLEAR REACTOR

CROSS-REFERENCE TO RELATED APPLICATIONS

This application is a National Phase Application of PCT International Application No. PCT/EP2010/068572, International Filing Date Nov. 30, 2010, claiming priority of French Patent Application No. 0958493, filed Nov. 30, 2009.

The present invention relates to a method and a device for the detection of rod drops in a nuclear reactor.

The invention relates more particularly to pressurised-water nuclear reactors (PWR).

The nuclear reaction which takes place in the reactor core is accompanied by the emission of a neutron flux distributed in the core, in particular along the axis of the fuel assemblies. The core comprises vertical recesses into which control rods comprising neutron-absorbing elements are guided in order to descend vertically into these recesses so as to absorb the neutron flux and thus to control the reactivity of the reactor core.

Conventionally, each control rod comprises a plurality of absorbers made of a neutron-absorbing material.

The control rods are held above the core and can be positioned in different insertion positions between a high position and a low position by means of insertion mechanisms.

Thus, the vertical displacement of each rod permits the reactivity of the reactor core to be regulated, thus permitting variations of the overall power supplied by the core from zero power up to nominal power (denoted below by PN); the position of the control rods, i.e. the state of penetration of the control rods in the fuel assemblies, is therefore a function of the power of the core.

The main effect of an accidental drop of one or more control rods into a recess is that the neutron flux is absorbed locally and the distribution of the neutron flux in the core is disturbed. This disturbance may be very important and risk causing a water boiling crisis leading to damage to the fuel crayons of the core, if this rod drop takes place when the reactor is operating at a high power level and if no corrective action is taken, since the power will rise to its initial value under the effect of the temperature self-regulation and negative feedback.

Such corrective action consists, for example, in the insertion of the control rods into the core in order to limit and/or to stop the reactivity of the core.

This is why pressurised-water nuclear reactors comprise devices for detecting rod drops which are formed in a known manner by a plurality of separated and independent detection chains.

Each of these chains is disposed so as to supply a drop signal corresponding to the detection of the rod drop and comprises at least:

a probe for measuring the neutron flux capable of measuring a neutron flux which, in the event of the rod drop, experiences a reduction that becomes all the greater, the closer the recess, where the drop has taken place, is to the probe;

primary processing means associated with the probe capable of supplying a primary drop signal only when the neutron flux measured by said probe experiences a reduction having a rate of decrease exceeding a predetermined rate threshold;

The detection device also comprises secondary processing means which receive the drop signals coming from the detection chains and supply a secondary signal of a rod drop only when they receive at least two primary signals of a rod drop coming from the primary processing means in such a way as to reduce the risk of engaging a corrective action in the absence of an actual rod drop in the core.

It is known that detection methods emit a drop signal when they detect a rapid rate of decrease of the neutron flux exceeding, as an absolute value, a threshold value typically equal to 6% of the nominal flux per second (for a reactor having a power of 1300 MWe); this rate corresponds to the derivative of the neutron flux as a function of time. This exceeding of the threshold occurs in the first moments of the incident when the nuclear power transient decreases during the rod drop.

However, this type of method is not sufficiently sensitive and does not permit rod drops to be detected in an adequate manner, in particular for drops leading to a "category 2" accident in the absence of detection of the rod drop.

So-called category 2 accident situations give rise to severe power transients involving a rapid increase in the power and/or a deformation of the power distribution, which risks damaging the fuel cladding due to a boiling crisis or due to a linear overpower.

Methods of detection have thus been developed, wherein a signal is emitted when the absolute value of the rate of decrease of the neutron flux exceeds a rate threshold equal to 3%, or even 2%, of the neutron flux per second, thus permitting more rod drops to be detected.

However, this progression rate threshold can be reached during the most severe normal operating transients, such as for example the house-load operation characterised by the abrupt disconnection of the reactor from the normal energy evacuation system; this low negative variation threshold of the flux reduces the operating margins of the reactor and gives rise to untimely and undesired corrective actions such as automatic shutdowns of the reactor.

Examples of the method for detecting a rod drop in a nuclear reactor are described in particular in documents U.S. Pat. No. 4,842,805, U.S. Pat. No. 6,118,837 and US 2009/0252272.

In this context, the subject-matter of the invention is a method aimed at solving the aforementioned problems and at improving the performance of a pressurised-water nuclear reactor by reducing the risk of non-detection of a rod drop by the detection device, at the same time guaranteeing optimum functioning of the nuclear reactor during normal operating transients.

For this purpose, the invention proposes a method for detecting a rod drop in a pressurised-water nuclear reactor, said method comprising the steps consisting in:

detecting a negative time derivative of the neutron flux, and comparing the absolute value of said time derivative with a first threshold value;

triggering a time delay if said absolute value is greater than said threshold value;

detecting a positive time derivative of said neutron flux, and comparing the absolute value of said time derivative with a second threshold value;

triggering the emergency shutdown of the reactor if the absolute value of said positive time derivative of said flux becomes greater than said second threshold value during said time delay.

Time derivative $$\frac{\partial \Phi}{\partial t}$$

of neutron flux Φ is understood to mean a variation of the neutron flux related to a given period of time.

Thanks to the invention, it is possible to detect more rod drops, not detected by the detection devices and methods of the prior art, whilst at the same time guaranteeing normal functioning of the nuclear reactor during the most severe normal operating transients, of the house-load type.

A house-load operation is characterised by the abrupt disconnection of the reactor from the normal energy evacuation system. The disconnection takes place by the opening of a line circuit breaker, whilst the core continues to supply its own auxiliaries. The repercussions of this transient on the reactor are a rapid reduction in the power supplied by the core at a value close to 30% of the nominal power.

The method according to the invention advantageously uses the detection of the rod drop by positive variation of the neutron flux.

When a first threshold is exceeded at the time of a negative variation of the neutron flux, said first threshold corresponding, as an absolute value, to a progression rate typically equal to or less than 5% of the neutron flux per second, the method triggers a time delay during which an emergency shutdown, or another corrective action, is triggered if the positive variation of the neutron flux is greater than the value of a second positive threshold.

The method for detecting rod drops in a pressurised-water nuclear reactor according to the invention can also have one or more of the following features, considered individually or in all technically possible combinations:
- the method comprises a step for determining an average derivative of the neutron flux over a time interval if said absolute value of said positive time derivative of said neutron flux remains between said second threshold value and a third threshold value during said time delay;
- said emergency shutdown is triggered if said average absolute value of said average time derivative of said flux is greater than said third threshold value during said time delay;
- said first threshold value corresponds to a variation equal to or less than 5% of the nominal flux per second;
- said second threshold value corresponds to a variation between 2% and 4% of the nominal flux per second;
- said third threshold value corresponds to a variation less than 1% of the nominal flux per second;
- said time delay corresponds to a duration less than one minute;
- said time interval for the determination of said average derivative corresponds to a duration less than said duration of said time delay;
- said time interval is essentially equal to 10 seconds.

The subject-matter of the invention is also a device for detecting rod drops, for implementing the method according to the invention, comprising:
- a probe for measuring the neutron flux adapted to the measurement of a neutron flux:
- primary processing means associated with the probe comprising:
  - means for detecting a negative time derivative of the neutron flux, and comparing the absolute value of said time derivative with a first threshold value;
  - means, for triggering a time delay if said absolute value is greater than said threshold value;
  - means for detecting a positive time derivative of said neutron flux, and comparing; the absolute value of said time derivative with a second threshold value;
  - means for triggering the emergency shutdown of the reactor if the absolute value of said positive time derivative of said flux becomes greater than said second threshold value during said time delay.

The term "essentially equal to" will generally be understood to mean a value within a range of ±10%.

Other features and advantages of the invention will emerge more clearly from the description which is given below by way of indication and is on no account limiting, making reference to the appended figures, among which:

FIG. 1A illustrates diagrammatically an evolution of power P of the reactor as a function of time, representative of a power transient resulting from a rod drop in the core of the nuclear reactor.

FIG. 1B illustrates diagrammatically an evolution of power P of the reactor as a function of time, representative of a normal operating transient.

During the normal operation of a water-pressurised nuclear reactor, i.e. in the situations known as category 1, power transients, i.e. power variations, can arise; power variations may thus be necessary, in particular to adapt to the electrical energy requirements of the grid, when one speaks of a normal operating transient.

It may in fact be useful, especially in countries such as France where 80% of electricity is produced by nuclear reactors, for the overall power supplied by the reactors to vary in order to adapt to the requirements of the power grid that they supply as a function of demand. In particular, it is desirable to be able to make the reactors operate at reduced power over a long period when the demand from the grid is low, before returning if necessary to nominal power PN.

A distinction therefore needs to be made between these power transients, so-called normal operating transients, and the most severe power transients resulting from so-called category 2 accident situations, caused for example by an excessive increase in load, an uncontrolled withdrawal of group(s) of rods, a dilution of boric acid or an undetected rod drops.

Figure 1A:
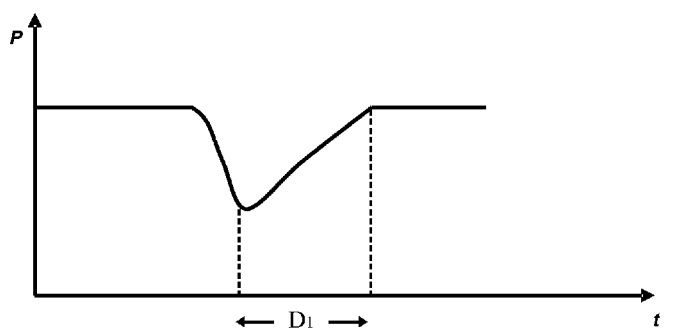
FIG. 1A illustrates diagrammatically an evolution of power as a function of time, representative of a power transient resulting from a rod drop in the core of a water-pressurised nuclear reactor.
Figure 1B:
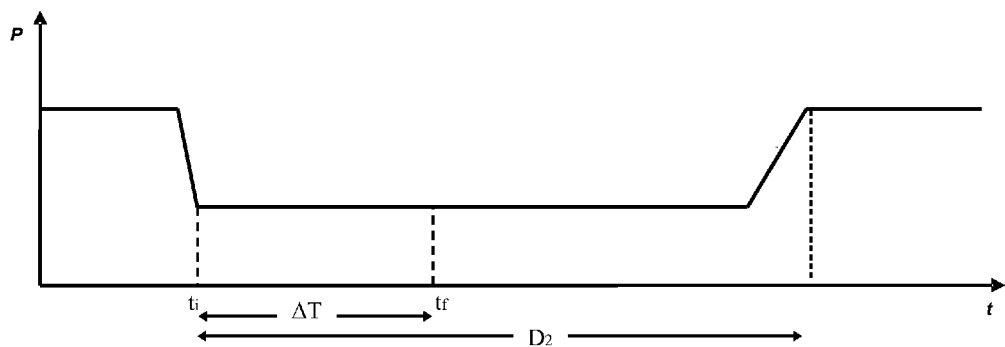
FIG. 1B illustrates diagrammatically an evolution of power as a function of time, representative of a normal operating transient.

FIG. 1A shows that the evolution of power P, following a rod drop, is characterised by a rapid drop in power P followed by an increase in power P in a time interval $D_1$ reduced compared to the power profile P representing a normal operating transient illustrated in FIG. 1B.

In the representation of the normal operating transient, the increase in power is triggered after a time interval $D_2$ which is greater than $D_1$.

Typically, for a pressurised-water nuclear reactor having a power of 1300 MWe, time interval $D_1$ is of the order of several seconds and advantageously 20 seconds, and time interval $D_2$ is of the order of several minutes to several hours.

The method according to the invention therefore permits a distinction to be made between a normal operating transient, of the load-following type or of the house-load type, and a rapid drop in power from a rod drop. When a power drop of the rod drop type is detected, the method according to the invention triggers a corrective action and/or an emergency shutdown, during the power rise phase, by means of a threshold using a positive derivative of the neutron flux.

The method according to the invention thus makes it possible to reduce the absolute value of the sensitivity of detection of the negative variation of the neutron flux of 6% of the nominal flux per second to a value equal to or less than 5% of the nominal flux per second, without disturbing the normal operation of the nuclear reactor, even in the case of severe operating transients of the house-load type.

Figure 2:
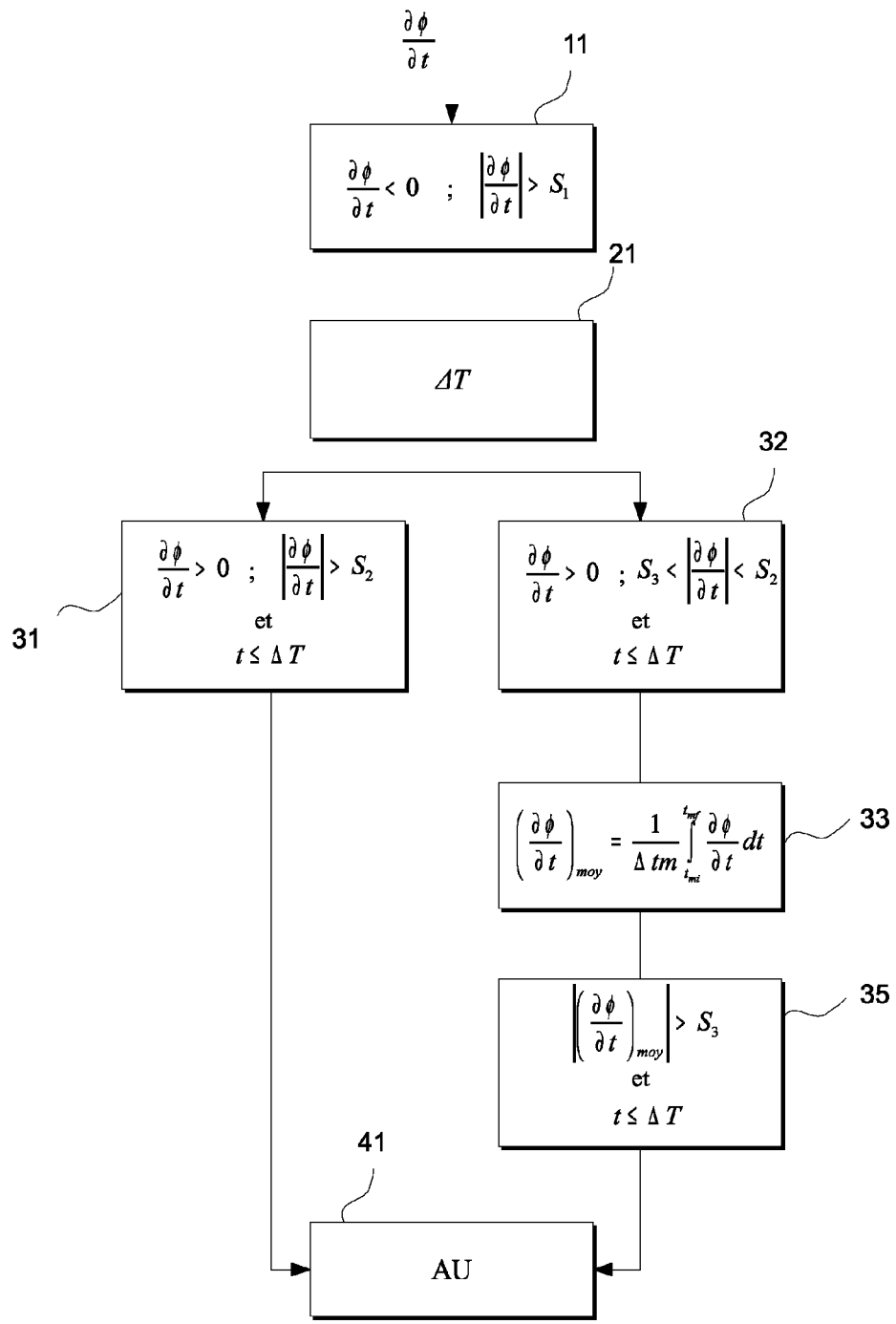
FIG. 2 illustrates the different steps in the detection method according to the invention.

For this purpose, the detection method according to the invention comprises the steps illustrated in FIG. 2.

The detection method according to the invention comprises a first step 11 for monitoring the variations in neutron flux $\Phi$ over time, neutron flux $\Phi$ being measured by means of a probe for measuring the neutron flux outside the core, referred to as an ex-core probe. In this first step 11, the method according to the invention monitors the variation in neutron flux $\Phi$ in such a way as to detect a negative variation of said flux by determining time derivative $$\frac{\partial \phi}{\partial t}$$

of said neutron flux; the variation in the neutron flux represents a progression rate of the neutron flux expressed in % of the neutron flux per second.

If this negative variation of the neutron flux is greater, as an absolute value, than the progression rate represented by a first threshold $S_1$, the method triggers a time delay $\Delta T$ at instant $t_i$, represented by step 21.

According to a first advantageous, non-limiting, embodiment of the invention, first threshold $S_1$ corresponds to a variation in the neutron flux essentially equal to or less than 5% of the nominal flux per second, and advantageously essentially equal to or less than 3% of the nominal flux per second. According to this advantageous embodiment of the invention, time delay $\Delta T$ corresponds to a time interval less than one minute, and advantageously of the order of 20 seconds (for a 1300 MWe reactor), triggered from detection instant $t_i$ corresponding to a negative variation in the neutron flux greater, as an absolute value, than first threshold $S_1$.

Starting from instant $t_i$ of the triggering of time delay $\Delta T$, and up to instance $t_f$ representing the end of time delay $\Delta T$, the detection method monitors the evolution in neutron flux $\Phi$ in such a way as to detect a positive variation of said neutron flux during this time interval.

If, during this time delay $\Delta T$, the evolution in the neutron flux corresponds to a positive variation greater than a progression rate represented by a second threshold $S_2$, as illustrated by block 31 in FIG. 2, the detection method according to the invention emits a rod-drop signal and/or triggers an emergency shutdown (AU), as illustrated by block 41 of FIG. 2.

According to a first advantageous, non-limiting embodiment of the invention, second threshold $S_2$ corresponds to a variation in the neutron flux essentially between 2% and 4% of the nominal flux per second, and preferably equal to 3% of the nominal flux per second.

If, during this time delay $\Delta T$, the evolution in the neutron flux corresponds to a positive variation between a progression rate represented by said second threshold $S_2$ and a progression rate represented by a third threshold $S_3$, less than said second threshold, as illustrated by block 32, the method then determines, in following step 33, an average variation of the neutron flux $$\left(\frac{\partial \phi}{\partial t}\right)_{moy}$$

averaged over a time interval $\Delta tm$, by means of the following relationship:

$$\left(\frac{\partial \phi}{\partial t}\right)_{moy} = \frac{1}{\Delta tm} \int_{t_{mi}}^{t_{mf}} \frac{\partial \phi}{\partial t} dt$$

where $t_{mi}$ and $t_{mf}$ are respectively the instants of the start and finish of said time interval $\Delta tm$.

It will be noted that time interval $\Delta tm$ starts at instant $t_{mi}$, corresponding to the crossing of threshold $S_3$, and corresponds to a duration typically of the order of 10 seconds (for a 1300 MWe reactor).

If the mean variation of the neutron flux $$\left(\frac{\partial \phi}{\partial t}\right)_{moy}$$

is positive and greater than the progression rate represented by said third threshold $S_3$, as illustrated by block 34, the detection method according to the invention emits a rod-drop signal and/or triggers an emergency shutdown (AU).

According to this first advantageous embodiment, third threshold $S_3$ corresponds to a variation in the neutron flux less than 1% of the nominal flux per second, typically of the order of 0.45% of the nominal flux per second. The determination of an average variation of the neutron flux over time interval $\Delta tm$ thus permits the parasitic functions to be filtered and the sensitivity for the detection of rod drops to be improved.

On the other hand, if, during this time delay $\Delta T$, the evolution in the neutron flux corresponds to a positive variation less than the progression rate represented by third threshold $S_3$, then no action is taken by the method, since the evolution of power corresponds to a normal operating transient.

If a positive variation of the neutron flux arises after time delay $\Delta T$ triggered at step 21, i.e. after $t_f$, the detection method according to the invention takes no action. If the power rise does not occur in time delay $\Delta T$, one is in fact again in the case scenario of a normal operating transient, as illustrated by the curve of FIG. 1B.

Thus, the method according to the invention permits a distinction to be made between the rapid power variation due to a rod drop and an evolution of power due to a normal operating transient, at the same time increasing the sensitivity for the detection of a negative variation of the neutron flux by reducing the first detection threshold.

Thus, the reduction of the first threshold for the detection of a negative variation of the neutron flux permits the detection of rod drops to be improved without triggering corrective actions or untimely emergency shutdowns during normal operating transients or during severe operating transients, such as for example the transients of the house-load type.

The method according to the invention in fact triggers a corrective action and/or an emergency shutdown by using the detection of a positive variation of the neutron flux and not by a negative variation.

Thus, according to the invention, the crossing of a threshold by positive variation of the flux and the triggering of the time delay participate in the improvement of the sensitivity of detection of rod drops and not in the execution of a function for inhibiting the emergency shutdown.

In pressurised-water reactors comprising a SPIN (Numeric Integrated Detection System), the detection of a larger number of rod drops also makes it possible to relax the threshold of the alarm low RFTC (Critical Heat Flux Ratio), the RECF threshold as well as the threshold of the alarm for linear-power monitoring with respect to failures due to pellet-cladding interaction, and to gain operating margin.

In pressurised-water nuclear reactors not comprising SPIN, the improvement in the detection of rod drops makes it possible to detect configurations of a rod drop capable of leading to a water boiling crisis.

The detection method according to the invention relates more particularly to the detection method implemented by the primary processing means associated with each measuring probe. Moreover, the primary processing means can be supplemented by secondary processing means which receive signals coming from each of the primary processing means, corresponding to each of the measuring probes, permitting the corrective action and/or the emergency shutdown to be validated only when the secondary processing means receive at least two signals for corrective action or emergency shutdown. Thus, the secondary processing means make it possible to reduce the risk of engaging a corrective action, of the reactor shutdown type, in the actual absence of rod drops in the reactor.

The invention claimed is:

1. A method for detecting rod drops in a pressurized-water nuclear reactor, said method comprising the steps:
    measuring a neutron flux value over time,
    continuously calculating a derivative of the measured neutron flux value,
    detecting a negative derivative of the neutron flux value, and comparing the absolute value of said negative derivative with a first threshold value (S1);
    triggering a first time interval ($\Delta T$) if said absolute value of said negative derivative is greater than said threshold value (S1);
    detecting a positive derivative of said neutron flux value within said first time interval ($\Delta T$), and comparing the absolute value of said positive derivative with a second threshold value (S2); and
    if, during said first time interval ($\Delta T$), said absolute value of said positive derivative is greater than the second threshold value (S2), then triggering an emergency shutdown of the reactor.

2. The method for detecting rod drops in a pressurized-water nuclear reactor according to claim 1, further comprising determining an average derivative of the neutron flux value over a second time interval ($\Delta tm$) if said absolute value of said positive derivative of said neutron flux value remains between said second threshold value (S2) and a third threshold value (S3) during said first time interval ($\Delta T$).

3. The method for detecting rod drops in a pressurized-water nuclear reactor according to claim 2, wherein said emergency shutdown is triggered if said average absolute value of said average time derivative of said neutron flux value is greater than said third threshold value (S3) during said first time interval ($\Delta T$).

4. The method for detecting rod drops in a pressurized-water nuclear reactor according to claim 1, wherein said first threshold value (S1) corresponds to a variation equal to or less than 5% of an expected neutron flux value per second.

5. The method for detecting rod drops in a pressurized-water nuclear reactor according to claim 1, wherein said second threshold value (S2) corresponds to a variation between 2% and 4% of an expected neutron flux value per second.

6. The method for detecting rod drops in a pressurized-water nuclear reactor according to claim 2, wherein said third threshold value (S3) corresponds to a variation less than 1% of an expected neutron flux value per second.

7. The method for detecting rod drops in a pressurized-water nuclear reactor according to claim 1, wherein said first time interval ($\Delta T$) corresponds to a duration less than one minute.

8. The method for detecting rod drops in a pressurized-water nuclear reactor according to claim 2, wherein said second time interval ($\Delta tm$) for the determination of said average derivative corresponds to a duration less than a duration of said first time interval ($\Delta T$).

9. The method for detecting rod drops in a pressurized-water nuclear reactor according to claim 2, wherein said second time interval ($\Delta tm$) is equal to 10 seconds.

10. A device for detecting rod drops configured to implement the method according to claim 1, comprising:
    a probe configured to measure a neutron flux value over time, and a primary processor configured to:
        continuously calculate a derivative of the measured neutron flux value;
        detect a negative derivative of the neutron flux value, and compare the absolute value of said negative derivative with a first threshold value (S1);
        trigger a first time interval ($\Delta T$) if said absolute value is greater than said threshold value (S1);
        detect a positive derivative of said neutron flux value during said first time interval ($\Delta T$), and compare the absolute value of said positive derivative with a second threshold value (S2); and
        if, during said first time interval ($\Delta T$), said absolute value of the positive derivative is greater than the second threshold value (S2), then trigger an emergency shutdown of the reactor.

11. The method for detecting rod drops in a pressurized-water nuclear reactor according to claim 1, wherein the step of continuously calculating the derivative of the measured neutron flux value determines the rate at which the neutron flux value is changing over time.

* * * * *